(12) United States Patent
Fraivillig et al.

(10) Patent No.: US 7,031,938 B2
(45) Date of Patent: Apr. 18, 2006

(54) FUNDS HAVING INVESTMENT RESULTS RELATED TO OCCURRENCE OF EXTERNAL EVENTS TO INVESTOR-SELECTED INVESTMENT OPTIONS

(76) Inventors: James Fraivillig, 98 Charles St. #1, Boston, MA (US) 02114; Brian K. High, 330 Winding Pond Rd., Londonderry, NH (US) 03058

( * ) Notice: Subject to any disclaimer, the term of this patent is extended or adjusted under 35 U.S.C. 154(b) by 17 days.

(21) Appl. No.: 10/723,187

(22) Filed: Nov. 26, 2003

(65) Prior Publication Data

US 2004/0098330 A1    May 20, 2004

Related U.S. Application Data

(63) Continuation of application No. 09/495,230, filed on Jan. 31, 2000, now abandoned.

(51) Int. Cl.
G06F 17/60    (2006.01)

(52) U.S. Cl. .................. 705/36 R; 705/36; 705/37; 705/35; 706/45; 273/237

(58) Field of Classification Search .............. 705/36 R, 705/36, 37, 35
See application file for complete search history.

(56) References Cited

U.S. PATENT DOCUMENTS 4,363,489 A * 12/1982 Chodak et al. ............. 273/237
5,743,525 A * 4/1998 Haddad ...................... 273/139
5,819,238 A * 10/1998 Fernholz ...................... 705/36
6,505,174 B1 * 1/2003 Keiser et al. ................. 705/37
6,606,615 B1 * 8/2003 Jennings et al. .............. 706/45
2002/0147670 A1 * 10/2002 Lange .......................... 705/35

FOREIGN PATENT DOCUMENTS

JP    11-110447    * 4/1999

OTHER PUBLICATIONS

Richard J. Bagby, A Convergence of Limits, Mathematics Magazine, Oct. 1998, 71, 4: Research Library, pp. 270-277.*

* cited by examiner

Primary Examiner—Vincent A. Millin
Assistant Examiner—Debra Charles
(74) Attorney, Agent, or Firm—Osha Liang LLP

(57) ABSTRACT

A system for causing investment returns for individual investors in a fund to correspond to occurrence of selected events with respect to investment options selected by said individual investors, the system including instructions for: defining a plurality of said investment options each having a yield calculator, said calculator having a value related to occurrence of predefined events; selecting a nominal yield of said fund; allocating a portion of said nominal yield to each of said investment options ratably with respect to the portion of said value of each said yield calculator bears to all values of said yield calculators; calculating, on a periodic basis, a change in total value of assets owned by said fund and ratably allocating said change to investors in said fund; and periodically redetermining said values in each of said yield calculators by measuring occurrence of said predefined events during a selected measuring period.

29 Claims, 5 Drawing Sheets

| TEAM | SEASON RECORD (WINS-LOSSES) | BEST REG. SEASON REC. | PLAYOFF QUAL | SEMI-FINAL WINNER | CHAMP-IONSHIP | POINTS FOR TEAM |
|---|---|---|---|---|---|---|
| A | 5-4 | | | | | 5 |
| B | 7-2 | | 2 | 4 | 6 | 19 |
| C | 2-7 | | | | | 2 |
| D | 2-7 | | | | | 2 |
| E | 6-3 | | 2 | | | 8 |
| F | 5-4 | | 2 | | | 7 |
| G | 8-1 | 3 | 2 | 4 | | 17 |
| H | 3-6 | | | | | 3 |
| J | 4-5 | | | | | 4 |
| K | 3-6 | | | | | 3 |
| TOTAL POINTS | 45 | 3 | 8 | 8 | 6 | 70 |

| TEAM | SEASON RECORD (WINS-LOSSES) | BEST REG. SEASON REC. | PLAYOFF QUAL | SEMI-FINAL WINNER | CHAMP-IONSHIP | POINTS FOR TEAM |
|---|---|---|---|---|---|---|
| A | 5-4 | | | | | 5 |
| B | 7-2 | | 2 | 4 | 6 | 19 |
| C | 2-7 | | | | | 2 |
| D | 2-7 | | | | | 2 |
| E | 6-3 | | 2 | | | 8 |
| F | 5-4 | | 2 | | | 7 |
| G | 8-1 | 3 | 2 | 4 | | 17 |
| H | 3-6 | | | | | 3 |
| J | 4-5 | | | | | 4 |
| K | 3-6 | | | | | 3 |
| TOTAL POINTS | 45 | 3 | 8 | 8 | 6 | 70 |

NOTE:
- NOMINAL FUND YIELD = 7%
- TOTAL NOMINAL SHARE PRICES = 33.69/0.07 = 481

60 —

| POLITICAL FUND | SHARE PRICE | TOTAL POINTS | YIELD |
|---|---|---|---|
| DEMOCRATS | $214.00 | 22.3 | 10.4% |
| REPUBLICANS | $256.00 | 16.2 | 6.3% |
| IND. AND OTHER | $11.00 | 0.2 | 1.8% |

61 —

U.S. POLITICAL "POINTS"

| | U.S. HOUSE | U.S. SENATE | U.S. PRES | STATE | TOTAL |
|---|---|---|---|---|---|
| CONVERSION FACTOR | X 0.02 | X 0.1 | X 10 | X 0.2 | |
| DEMOCRATS | 4.22 | 4.5 | 10 | 3.6 | 22.32 |
| REPUBLICANS | 4.46 | 5.5 | 0 | 6.2 | 16.16 |
| IND. AND OTHER | 0.01 | 0 | 0 | 0.2 | 0.21 |
| TOTAL | 10.62 | 10.0 | 10.0 | 10.0 | 33.69 |

62 —

U.S. POLITICAL OFFICES

| | U.S. HOUSE | U.S. SENATE | U.S. PRES | STATE |
|---|---|---|---|---|
| DEMOCRATS | 211 | 45 | 1 | 18 |
| REPUBLICANS | 223 | 55 | 0 | 31 |
| IND. AND OTHER | 1 | 0 | 0 | 1 |

FUNDS HAVING INVESTMENT RESULTS RELATED TO OCCURRENCE OF EXTERNAL EVENTS TO INVESTOR-SELECTED INVESTMENT OPTIONS

CROSS-REFERENCE TO RELATED APPLICATIONS

This is a Continuation of U.S. patent application Ser. No. 09/495,230 filed on Jan. 31, 2000, now abandoned.

STATEMENT REGARDING FEDERALLY SPONSORED RESEARCH OR DEVELOPMENT

Not Applicable.

BACKGROUND OF INVENTION

1. Field of the Invention

The invention is related to the field of methods for determining investor payout from a common investment fund based on selections made by individual investors of their expectations of occurrence of external events not related to investment returns.

2. Background Art

A very common investment vehicle used by small investors is shares in "open-end" mutual funds. Open-end mutual funds are a pool of capital from individual investors which is itself invested in other investment vehicles. Open-end mutual funds issue new shares on receipt of cash from investors. The number of shares purchased for any particular sum of money is based on a per-share value at the time of purchase. Similarly, an open-end fund investor may liquidate some or all of his fund holdings by sale of fund shares, which then are removed from the fund's "float" (number of shares outstanding). The per-share price is typically calculated as the total value of all the investments owned by the mutual fund, plus cash on hand, divided by the number of shares outstanding at the time of the particular purchase or sale. By this method of calculation, when the mutual fund accepts newly invested cash, no change in the per-share price of the mutual fund takes place as a result, because the total assets owned by the fund increase exactly as the amount of newly invested cash and the number of shares increases relative to the exact per-share price.

Mutual funds, including open-end funds have many different investment objectives, and therefore invest fund assets in various investment vehicles, although most funds invest primarily in publicly traded stocks and bonds. As the value of the investment vehicles changes, the per-share value of the mutual fund will also change correspondingly. A common type of open-end mutual fund is known as an "index fund." Index funds generally invest fund assets in shares of stock which underlie one or more of the commonly tracked stock indices, for example the S & P 500 index (a trade name of Standard and Poor's Inc.) or the Dow Jones Industrial Average (a trade name of Dow Jones & Co., Inc.). Because index funds invest in the stocks which underlie the particular index, the investment performance of the typical index fund will closely correspond to the performance of the index to which the fund is tied. Many other types of mutual funds exist. Each of these mutual funds has a stated investment objective and each fund invests the fund's assets in investment vehicles which are intended to fulfill the investment objectives of the particular mutual fund.

Irrespective of the investment objectives of a particular mutual fund, the individual investor in a mutual fund has substantially no ability to select the investments made by the fund. These investments are typically selected by a fund manager or other investment advisor on behalf of the fund. In some cases, an individual investor may desire to make some selection within the framework of a particular mutual fund which enables the individual investor to affect the total return he obtains by investing in the mutual fund. In particular cases, the individual investor may have some knowledge or expertise which is not related to selection of investment vehicles, which the investor would desire to use to enhance his investment returns. For example, some investors have good working knowledge of professional sports franchises, political parties, or other non-financial endeavors and their present and expected performance, and may desire to use that knowledge or expertise to enhance his investment performance with respect to that of an ordinary mutual fund.

It is desirable to have an investment vehicle operating within the framework of a mutual fund which provides for investor selection of various investment options therein calculated to enable individual investors to affect their investment return.

SUMMARY OF INVENTION

The invention is a method for having individual investor returns in a mutual fund relate to occurrence of selected events to investment options selected by individual investors in the fund. The method includes defining a plurality of investment options in the mutual fund. Each of the options has a yield calculator. Each yield calculator has a value related to occurrence of predefined events to each one of the options. A nominal yield of the fund is selected and a portion of the nominal yield is allocated to each of the investment options ratably with respect to the portion of the value of the yield calculator bears to the total of all the values of all the yield calculators. On a periodic basis a change in the total value of assets owned by the mutual fund is calculated and the change is allocated to investors in said fund. In one embodiment the asset value calculation includes recalculating the asset values daily and allocating gains or losses daily to investor accounts in the mutual fund. Periodically the values in each of the yield calculators is redetermined by measuring the occurrence of the predefined events during a selected measuring period. In one example, the measuring period is 52 weeks trailing the current valuation date of the mutual fund and investor accounts therein.

In one embodiment of the invention, a per-share price for each of the investment options is determined based on a relative ownership of each of the options.

In one embodiment of the invention, the investment options represent sports teams, such as football teams in a league. In this embodiment, the predefined events represent game wins by the sports teams, in regular season play, and optionally post-season play.

In another embodiment of the invention, the investment options represent political parties. The yield calculator for each political party is incremented by a selected amount based on numbers of members of each political party being elected to particular elective offices. An amount by which the yield calculator is incremented for each elected official in one example is inversely related to the numbers of elective offices of that type. In one embodiment, the elective offices include United States Representatives, United States Senators, President of the United States and Governors of each of the United States.

Other aspects and advantages of the invention will be apparent from the following description and the appended claims.

BRIEF DESCRIPTION OF DRAWINGS

FIG. 1 shows a table to illustrate calculating the investment yield for each sports team selected by investors in one embodiment of the invention.

FIG. 5 shows a table to illustrate calculating investment yields for political parties as investment options based on election results.

DETAILED DESCRIPTION

Figure 2:
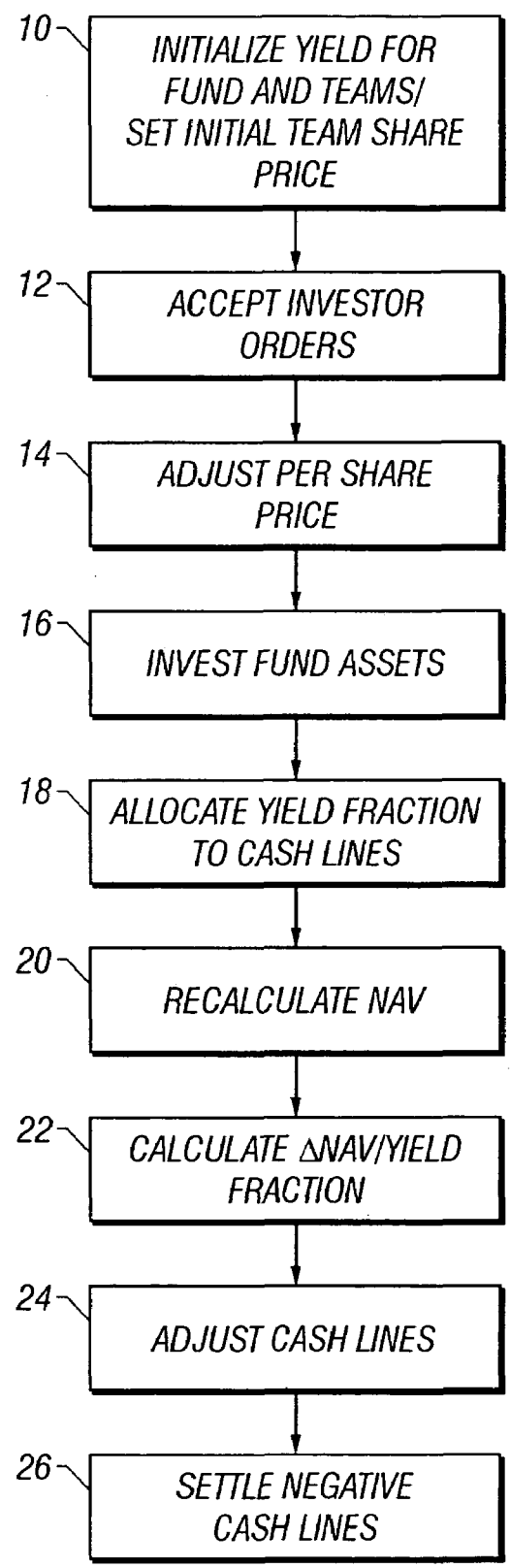
FIG. 2 is a flow chart showing the initialization and daily reevaluation of the fund value and investor account values.

The invention preferably operates within the framework of an open-end mutual fund. As is well known in the art, open-end mutual funds are a pool of capital obtained from individual investors which is itself invested in other investment vehicles. Open-end mutual funds issue new shares of the fund upon receipt of cash from individual investors. The number of shares of the mutual fund purchased for any particular sum of money placed in an investor account is based on a per-share price extant at the time of the purchase. When shares of an open-end fund are purchased by an investor, the number of fund shares outstanding ("float") increases by the number of shares purchased. Similarly, an open-end fund investor may liquidate some or all of his fund holdings by sale of fund shares, which then are removed from the fund's float. The per-share price of the mutual fund shares is typically calculated as the total value of all the investments owned by the mutual fund, plus cash on hand, divided by the number of shares outstanding at the time of the particular purchase or sale. By this method of calculation, when the mutual fund accepts newly invested cash, no change in the per-share price of the mutual fund takes place as a result, because the total assets owned by the fund increase exactly as the amount of newly invested cash and the number of shares increases relative to the exact per-share price. Similarly, liquidation of fund shares by an investor does not change the fund per-share price because the shares are removed from the float exactly as their net per share value within the fund.

In any event, in the typical prior art mutual fund all investors in the fund share equally in the fund's overall return on investment within any selected period of time during which fund shares are owned. The invention provides, within the framework of a mutual fund, investment options which enable individual investors in the fund to affect their return on investment relative to the other investors in the fund by selecting particular ones of the investment options for which predetermined external events affect the selected investment options in a defined manner.

The following description of one embodiment of the invention is presented in terms of teams in a sports league, because selection of one or more of such sports teams is one example of a way for an individual investor to affect his investment performance by the occurrence of external events which can favorable affect the option selected by that investor. In this embodiment of the invention, an individual investor can purchase mutual fund shares by purchasing "shares" of a sports team he selects out of a league of such teams. The sports teams/league will typically represent or correspond to actual sports teams such as those in professional, college or amateur sports leagues. The playing performance of the investor-selected teams during a preselected period of time, such as the most recent calendar year, can be used to affect the investment results that an individual investor obtains from the mutual fund, as will be further explained.

Individual investors, to invest in the fund of the invention, pay in sums of cash to a mutual fund managed by a fund manager or investment advisor, or similar asset management system. The cash may be obtained by check or wire transfer, or in one embodiment, may be transferred from an investor's cash advance line on a credit card or debit card. As in conventional open-end mutual funds, the cash assets paid into the fund of the invention by its individual investors is itself invested in generally liquid assets such as common stocks, according to the stated investment objectives of the mutual fund. In this example, the investments purchased by the mutual fund are common stocks which underlie a published stock index. It should be clearly understood that the investment objectives and the investments made by the fund to accomplish the fund objectives are not a limitation on the invention.

Individual investors can select, within the mutual fund of the invention, various of investment options whose individual performance will be related to the occurrence of external events, such as the playing performance of the sports teams. The investment performance obtained by an individual investor will be related, therefore, to both the investment performance of the assets owned by the mutual fund generally, and to the occurrence of particular external events, such as game wins, to the investment options (sports teams) selected by the individual investor.

FIG. 1 shows a table having therein ten individual teams, labeled A–K, in a hypothetical football league (although any other type of sports league will be similar in overall structure). The table in FIG. 1 includes the regular season win/loss record and the post-season record, where applicable, for each team in the league. Each win by one of the teams during regular season play results in that team having an investment yield "calculator" for that team incremented by a selected amount. In this embodiment, the selected amount is one "point" per regular season win. In this embodiment, the team which accumulates the best regular season win/loss record can have its yield calculator incremented by another selected amount, such as three "points". Post-season play, such as quarter-finals, semi-finals and a championship game can have additional selected numbers of points added to the "calculator" of the teams which win the respective post-season games, such as shown in the table of FIG. 1. The manner of incrementing the yield calculator is a matter of discretion for the designer of the mutual fund, and the manner of incrementing the yield calculator explained herein is only meant to illustrate the principle of allocating yield to an investment option within the mutual fund of the invention.

The total numbers of all the yield calculator points, represented by tp, used to calculate the investment yield for each team are shown in the TOTAL row at the bottom of the table in FIG. 1. The manager or operator of the mutual fund can then set a nominal fund yield, y (return on fund investment). In this example, as will be further explained, each investor's account within the fund of the invention is adjusted on a periodic basis, in this embodiment daily, to have added thereto a ratable portion of the nominal yield allocable to each of the investment options (teams) held in the individual investor's account. If the fund yield is calculated daily, then each investor account will accrue daily 1/365 of the portion of the fund's total nominal yield that is allocated to each team's shares he owns in his account. The adjustment can take the form of a credit to a "cash line" (which will be further explained) in the investor account, or any other method for ratably adjusting the total value of the investor's account. The adjustment can also take the form of purchase of additional shares, at the then extant per-share price, in selected teams in the investor's account. The particular team shares purchased can be the same or different as the team which generated the allocable yield. The nominal fund yield can be based on the expected investment performance of the assets owned by the mutual fund, or any other basis. As previously explained, fund's assets can be invested in stocks, for example, those stocks which underlie a published stock index.

In this embodiment of the invention, the nominal fund yield can then be used to calculate an initial total per-share price, P, of all the teams in the league. The total of all the initial per-share prices of all the teams can be determined by the expression:

$$P = tp/y$$

Each individual team in the league in this embodiment will have an individual investment yield related to the fractional amount of the total number of yield "points" allocated to that team. That is, the total amount of the nominal yield for the entire mutual fund is allocated to each team ratably on the basis of each team's share of the total number of yield "points". For example, team G in FIG. 1 will return 17/70 of the total yield of the mutual fund because it earned 17 points out of the total of 70 points, while team A will be allocated 5/70 of the total nominal yield of the fund. Referring to FIG. 2, the initialization is shown at box 10.

After the initial price is set by the fund manager according to the previous expression, the per-share price of shares for each individual team in the league in this example is subsequently related, by a preselected function or relationship, to the fractional amount of the total team ownership of the mutual fund represented by the individual team with respect to the total ownership of all teams. This amount is referred to as the "relative ownership". What is significant about the relative ownership is that as shares of a team are sold by investors, the team's relative ownership will be reduced, and correspondingly, the per-share price of that team will be changed according to the preselected relationship. In this embodiment, as the relative ownership increases for each individual team, its share price will increase according to the predetermined relationship. Similarly, the per-share price will decrease as relative ownership decreases. Accepting investor orders is shown in FIG. 2 at box 12. Investor orders in this embodiment of the invention include payments into the fund of money. The investors may allocate any portion or all of the money paid in such orders in to shares of selected teams. Money not allocated to any particular team or teams will form part of the balance of a "cash line" in the investors' accounts. Similarly, upon sale of team shares, a credit to the investor's cash line will be applied based on the number of shares sold and the price of each share sold. The investor may generally request liquidation of some or all of his cash line balance.

The relationship between team share price and relative ownership can be selected and/or adjusted by the fund manager during operation of the mutual fund or can be fixed at the time the fund is created. In this embodiment, the preselected relationship between an individual team's share price, Z, and its relative ownership can be represented by the expression:

$$Z = 175 \times \arctan(0.5 \times (T \times N/X) - 1) + S$$

where T represent the number of shares owned for the particular team, N represents the number of teams and S represents a target per-share price for a relative ownership value of 1 (unity) for any team, and X represents the total number of shares of all teams held by all investors in the fund. It should be understood that the relationship between share price shown in the preceding expression is only one example of a relationship which can be used with the invention. Other types of relationships can also be used to calculate per-share price of individual teams, including linear relationships. Factors which may be considered in the design of the relationship include the desired level of volatility of share price with respect to relative ownership, and maximum and/or minimum attainable share price. Adjusting the share price to account for relative ownership changes after processing investor orders is shown in FIG. 2 at box 14.

As previously explained, increases in the relative ownership of a particular team will provide corresponding increases in the per-share price of that team. Shares of that team still owned by other fund investors will increase in value correspondingly to the increase in per-share price of that team. Similarly, teams which undergo a reduction in relative ownership will be reduced in price correspondingly, as previously explained. Shares in such teams still owned by investors in the fund will be correspondingly reduced in overall value. Another result of the relationship between share price and relative ownership is that as one team's relative ownership decreases by reason of sales of shares in that team, the relative ownership and the corresponding share price of the other teams rises.

As a practical matter, using the relationship as previously described, when an investor places an order to buy or sell a plurality of shares of a particular team, the price paid or received for each single share will not be exactly the same as the price of the other shares because the relative ownership of the team changes with each share purchased or sold (assuming the team at issue is not the only team whose shares are owned). The share price/relative ownership relationship used in this embodiment is non-linear, and as a result, calculating a per share buy or sell price by such methods as simple averaging of beginning and ending share prices in a multiple-share transaction may not accurately reflect the true per share price of each share in the transaction. The speed of modern computers makes practical that the corresponding per-share price of each team can be calculated on the basis of each single share purchased or sold in a transaction, and in this embodiment, the relative ownership and resulting price per share can be calculated iteratively on a per share basis. It is clearly within the contemplation of this invention, however, that per share prices could be based on average of initial and final price, or any other reasonable formula related to the price relationship with respect to relative ownership. A result of calculating per-share price according to a relationship such as described previously is that when a fund investor orders a purchase or sale of a plurality of shares of a particular team, the price paid or received for the plurality of shares will not correspond exactly to the per-share price of that team extant at the time the order is entered into the mutual fund. The significance of this result will be further explained.

The embodiment of the invention as described herein where the per-share price of the individual investment options, such as sports teams, is related to relative ownership is only one example of causing the investment return of the mutual fund to be related to occurrence of external events to the investment options in the fund. It should be noted that the per-share price of the investment options within the fund need not be related to relative ownership. It is also possible to have the investment options in the fund have fixed per-share prices, or to have per-share prices related to the total value of the fund's assets. In such cases, the portion of the nominal yield allocable to each of the investment options, such as the sports teams, can be calculated as previously explained. The yield portion allocable to each investment option (team) can then be adjusted on a periodic basis to reflect the performance of the team during the measuring period, also as previously explained.

A practical consideration when using a relationship between relative ownership and per-share price is the possibility of dramatic changes in relative ownership of certain popular teams when the fund is initially opened to new investors. Depending on the volatility of per-share price with respect to relative ownership, it is possible for initial investments in the fund to congregate to such popular teams, driving up the per-share price, which itself may result in congregation of future investment in the shares of such teams. This may result in the equivalent of positive feedback in the per-share price of certain teams early in the fund's life. One example of a method to reduce the volatility of the per-share pricing of teams shortly after opening the fund to investors is to have a selected number of each of the team shares initially considered to be owned by the fund itself for purposes of calculating the relative ownership of each team, such shares referred to herein as "fund held shared". Fund held shares in this example can be allocated in number so that the ratio of the yield points allocable to each team with respect to initial per-share price of the fund held shares for each team results in an approximately equal effective yield for each team's shares. As shares of individual teams are purchased by investors, they first are removed from the allocation to fund held shares for the respectively purchased team shares. Newly issued team shares would then be created after the fund held shares were exhausted. Other forms of dampening the volatility of per-share pricing on opening the fund to investors may be used, this being only one example of such dampening methods.

Each investor's account in this example includes the previously described "cash line", or an amount of his total investment account value which is not allocated to any one particular team. Amounts in the "cash line", as previously explained, can arise by payment of cash into the mutual fund by an investor which exceed purchases of shares in any of the individual teams, by proceeds of sale of shares in individual teams where cash is not withdrawn from the fund by the investor, by allocation of a portion of the nominal yield of the fund to the investor account, and by the relative investment performance of the assets in the mutual fund with respect to the nominal yield of the mutual fund as selected by the fund manager. In this embodiment, the cash line is calculated on a daily basis. The net value of the invested assets of the fund is calculated as of the close of stock trading each day, as is conventional for an open-end mutual fund. This is shown in FIG. 2 at box 16. The net asset value is calculated in a manner conventional for open-end mutual funds, typically being the total value of cash on hand plus value of all assets. Each investor's investment account value is then adjusted each day by an amount related to the daily allocable fraction of the nominal yield of each of the teams in his account (number of shares of each team multiplied by the yield of each team). This is shown in FIG. 2 at box 18. The amount by which the daily change in the fund net asset value exceeds or falls short of the daily increment in the investors' total account value is then be used to increment or decrement each investor's cash line. The increment or decrement applied to each investor's cash line is based on the individual investor's fractional ownership of the total assets of the mutual fund. The fractional ownership of each investor can be defined as the account value for each investor divided by the net asset value of the fund. Each investor's account value is equal to the number of team shares owned multiplied by the per share price of each team, plus the net balance in the investor's cash line. These elements are shown at boxes 20, 22 and 24 in FIG. 2.

Individual investor accounts which accrue negative values in the cash line may be adjusted, for example, by reducing the number of team shares owned by the investor on any basis selected by the fund manager or by the investor. In one example, the mutual fund may have a default provision to reduce the number of shares of all owned team shares on a ratable basis, or may reduce ownership of highest or of the lowest priced team shares in an investor account; or the investor may provide instructions as to how to reduce share ownership such as standing instructions to reduce ownership of a particular team. Still another example of adjustment of negative cash line amounts is to apply a charge to the investor's credit card in the amount of the negative cash line so as to eliminate the negative cash balance. This is shown at box 26 in FIG. 2.

A beneficial effect the foregoing method of adjusting investor account values is that investors who own shares of higher yielding teams have a smaller net amount of loss allocated to their accounts when the fund assets decrease in value, and conversely are allocated a larger overall increase in yield when the fund assets increase in value. It is, however, clearly within the contemplation of this invention that daily actual yields of fund assets can be calculated and ratably allocated to investor accounts on the basis of the fractional amount of the total nominal yield corresponding to the teams owned by the individual investors.

Figure 3:
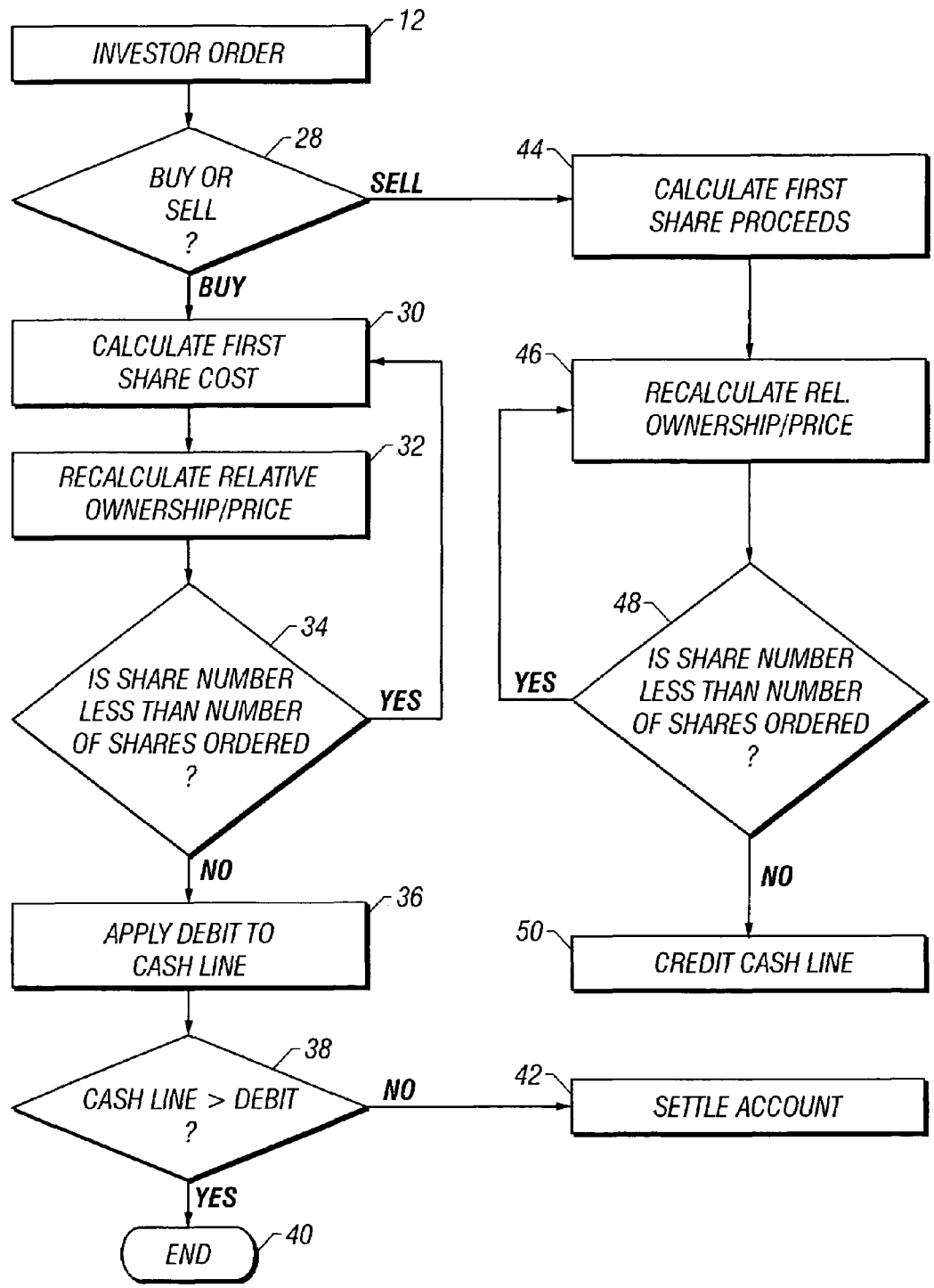
FIG. 3 is a flow chart showing processing of an investor buy or sell order.

As previously mentioned herein, a sale of shares of a team by an investor will result in cash line proceeds credited to his account that are less than the stated team value (team shares multiplied by extant price) because liquidation of team shares will reduce the relative ownership and per share price realized as the team shares are sold. It is advisable when designing a mutual fund according to the invention to include in a report or statement to the individual investors an item which reflect the liquidation value of his account. The liquidation value can be calculated as the net proceeds of sale that could be expected if the investor were to liquidate his position. The net proceeds to be realized on sale of each team's shares in the investor account can be calculated on a per share basis with respect to relative ownership change as a result of the sale, as explained previously herein. As is conventional for open-end mutual funds, the fund may keep some cash on hand (not invested in other vehicles) to settle investor liquidations, and if such cash becomes short or exhausted, sell some of the investment vehicles to raise any necessary liquidation settlement cash. This is explained in FIG. 3, wherein an order, at 12, is entered into the fund. If the order is a buy order, the first share cost is calculated at 30. The change in relative ownership/share price which occurs as a result of the purchase is shown at 32. The share number is then compared, at 34, to the number of shares ordered. If the share number is less, the calculation/price adjustment is recalculated. If the share number is equal to the total number ordered, the fund then, at 36, debits the investor's cash line. If the cash line value exceeds the debit amount, at 38, the transaction ends at 40. If the cash line is less than the debit amount, the account must be settled, at 42, by wire transfer, check, or the like, or preferably by credit card transaction. If the order is a sell order, the process is shown at boxes 44, 46, 48 and 50 in FIG. 3, wherein the final step of crediting the investor's cash line can end the transaction, or as is conventional for open-end mutual funds, the investor may choose to settle all or part of his cash line by cash settlement.

Periodically, such as by using rolling periods of time, for example, 52 trailing weeks from the date of fund value calculation, or any other suitable method of selecting a measuring period, the yield calculator for each team should be adjusted to reflect the actual performance of each team in regular and post season play. For example, using a trailing 52-week time period, as a new playing season begins, previous season game results in the week which fall outside the 52 trailing week period can be dropped from the "point" count for each team, while the results of the most recently added week can be included in the point count for each team. This provides for a yield calculation for each team which is adjusted for, and corresponds to, the actual performance of each team during the measuring period. An individual investor who purchases shares of poor-performing teams having low yield allocation fractions at the time of purchase may well see the value of his team shares rise if the performance of the team improves during later measuring periods, with corresponding increase in yield allocation. It may also be the case that as such team's performance improves, its relative ownership will increase, thereby increasing the per-share price, and resulting value, of the earlier investor's shares. This would provide the individual investor who selects teams having improved performance with a larger portion of the total nominal yield of the mutual fund.

It is within the contemplation of this invention that multiple sports, and multiple leagues can be made available as investment options simultaneously within a single mutual fund. For example, professional major-league football, hockey, basketball and baseball leagues and teams therein could all be included in a single fund to provide substantially continuous performance adjustments and yield adjustments to the fund. Investors who do not wish to participate in all the sports options, of course, need not do so, for example, by confining their team investments to those in one sports league.

Figure 4:
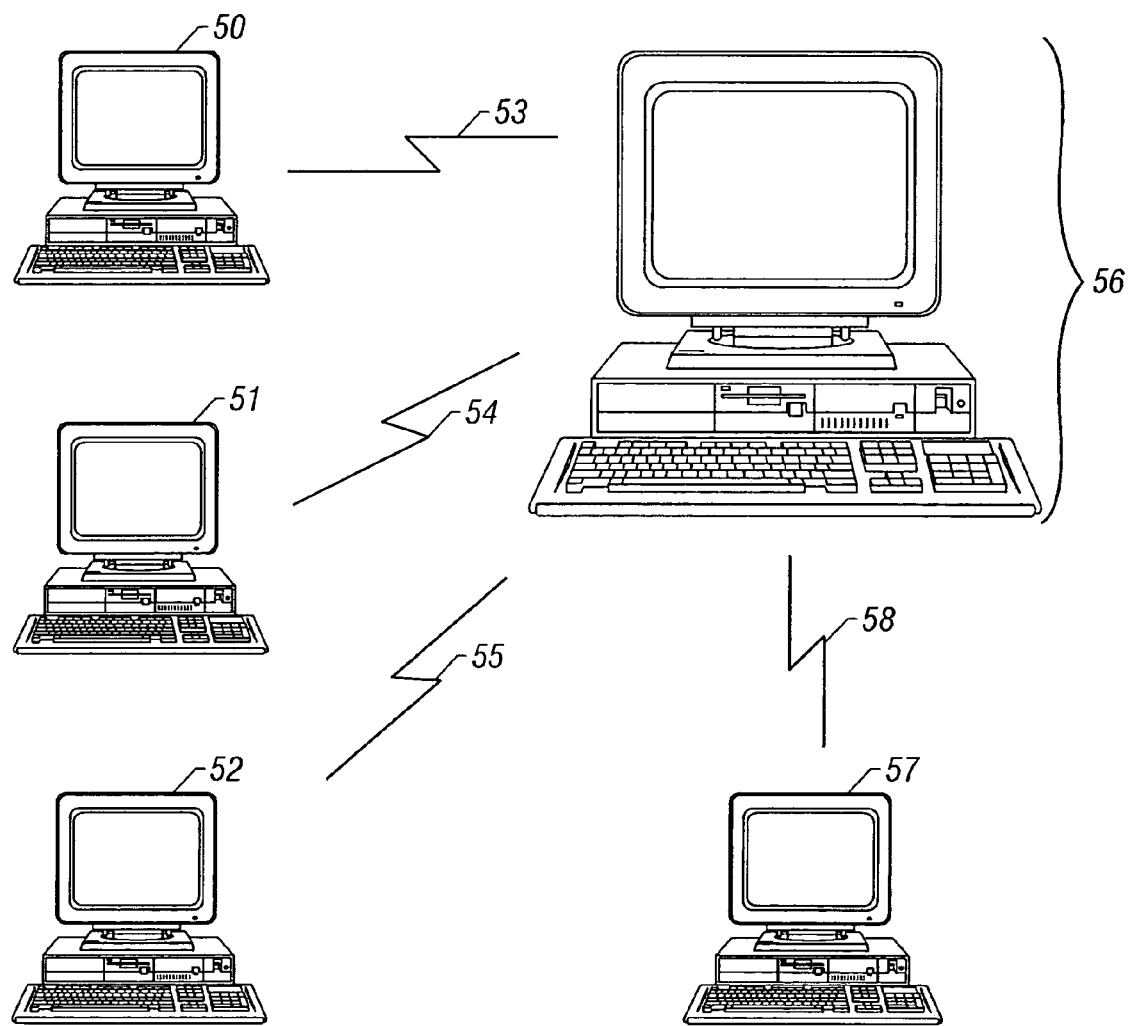
FIG. 4 shows an Internet-based implementation of the invention.

While the mutual fund of the invention can be implemented in any manner as is conventional for mutual funds, including mail orders, fax-orders, etc., a preferred implementation, shown in FIG. 4 is to have the mutual fund operate as a computer program residing on an Internet-connected server 56. The fund operator or manager may reside at the site of the server 56 or may access the server 56 by Internet service provider connection 58 to a remote control computer 57. The system operator should receive daily reports of the cash invested by investors in the fund so that the fund assets can be invested according to the stated investment objectives of the mutual fund. Investors can access the fund from their own personal computers 50, 51, 52 over Internet connections 53, 54, 55 from an Internet service provider of the investor's choice. As is conventional for business transactions over the Internet, each investor or prospective investor in the fund can access the server 56 by entering the URL (uniform resource locator) of the server into his Web browser. Individual account information can be stored on the server 56 to identify the individual investor and verify the identity of the user accessing the server 56 over the Internet connection in any manner conventional for Internet business transactions.

The preceding description of the invention was based on results achieved by various sports teams in league play. Another embodiment of the invention is related to election results of political parties. FIG. 5 shows a table at 61 including numbers of Democrats, Republicans and Independent/Other Party who have been elected to various public offices, such as United States Representative, United States Senator, President of the United States, and Governor of each of the United States. Each party member elected to one of the listed public offices will earn the listed party a preselected number of yield calculator points. Similarly to the sports team embodiment, the relative difficulty of being elected to the particular office (assumed in this example as being inversely related to the number of such offices) can be accounted for by allocating larger numbers of points to the more difficult offices. As shown in the table in FIG. 5, each House seat earns 0.02 yield points, each Senate seat 0.1 points, the Presidency earns 10 points, and each state governorship earns 0.2 points. The raw numbers of elected officials are shown in the table at 62. The conversion of the numbers of officials in the table at 61 to numbers of yield points is shown in the table at 62. An initial per share price of each party, and its allocated fraction of the nominal fund yield, are shown in the table at 60 in FIG. 5. Per share yield and price can be calculated as in the previous embodiment of the invention, based initially on the allocated yield and total of the per-share prices, and subsequently on relative ownership which can be calculated according to a formula similar to the formula used for calculating per-share price as in the previous embodiment of the invention. In this embodiment of the invention, investors who correctly speculate on expected future improvements in the relative electoral position of a political party may be rewarded with a higher allocated fraction of the total nominal yield of the fund, as well as possible improvement in the per-share price based on increased relative ownership of the political party's shared in overall fund ownership. A measuring period, such as trailing 52 weeks. can be used to periodically update the yield allocation to the political parties forming the options in this embodiment of the fund of the invention, although the exact measuring period is not meant to limit this embodiment of the invention.

The foregoing description is meant to serve only as examples of mutual funds having individual investor returns related to occurrence of external events to options within the fund that investors select. It will be apparent to those skilled in the art that other embodiments of the invention can be devised which do not depart from the spirit of the invention as disclosed herein. Accordingly, the invention shall be limited in scope only by the attached claims.

What is claimed is:

1. A system for causing investment returns for individual investors in a fund to correspond to occurrence of selected events with respect to investment options selected by said individual investors in said fund, the system comprising a computer having a program including instructions for:

defining a plurality of said investment options each having a yield calculator, said calculator having a value related to occurrence, to each said option, of predefined events;

selecting a nominal yield of said fund;

allocating a portion of said nominal yield to each of said investment options ratably with respect to the portion of said value of each said yield calculator bears to a total of all values of all of said yield calculators;

calculating, on a periodic basis, a change in total value of assets owned by said fund and ratably allocating said change to investors in said fund; and periodically redetermining said values in each of said yield calculators by measuring occurrence of said predefined events during a selected measuring period.

2. The system as defined in claim 1 further comprising determining a per-share price for each of said investment options based on a relative ownership of each of said options.

3. The system defined in claim 2 wherein said relative ownership is linearly related to said per share price.

4. The system as defined in claim 2 wherein said relative ownership is non-linearly related to said per share price.

5. The system as defined in claim 2 further comprising dampening changes in said per-share price for each of said investment options on initial opening of said fund to investors.

6. The system as defined in claim 5 wherein said dampening comprises setting up an initial number of shares of each of said investment options deemed to be owned by said fund, said deemed owned shares being first sold to ones of said investors electing to purchase shares of said options, wherein newly issued shares of each of said options occurs upon exhaustion of said deemed owned shares, said deemed owned shares forming part of a calculation of said relative ownership.

7. The system as defined in claim 5 wherein said relative ownership is related to said per share price by the expression:

$$Z=175 \times \arctan(0.5 \times (T \times N/X) - 1) + S$$

wherein T represent a number of shares owned for a selected one of said options, N represents a number of said options in said fund, S represents a target per-share price for a relative ownership value of one for any one of said options, X represents a total number of shares of all said options held by all investors in the fund, and Z represents said per share price.

8. The system as defined in claim 1, wherein said investment options comprise sports teams and said predefined events comprise game wins by said sports teams.

9. The system as defined in claim 8, wherein said sports teams comprise one selected from the group of professional baseball, professional basketball, professional hockey and professional football.

10. The system as defined in claim 8, wherein post-season game wins each increment said yield calculator to a greater extent than do each regular season game win.

11. The system as defined in claim 1, wherein said investment options comprise political parties and said predefined events comprise public officials elected to office who are members of one of said parties.

12. The system as defined in claim 11, wherein an increment to said yield calculator allocated with respect to election of members of one of said political parties to a particular public office is inversely related to numbers of said particular public office.

13. The system as defined in claim 12, wherein said particular public offices comprise United States Representatives, United States Senators, the President of the United States and Governors of each of the United States.

14. The system as defined in claim 1, wherein said nominal yield comprises a fixed value based on an expected return of said assets owned by said fund, and said method further comprises periodically calculating a difference between an actual return on said assets and said nominal yield, and allocating said differential to said investors.

15. The system as defined in claim 14, wherein said return on assets and said difference comprise daily calculation thereof.

16. The system as defined in claim 15, wherein said difference comprises allocation to said investors on a daily basis.

17. The system as defined in claim 1, wherein said assets comprise stocks underlying a selected stock index.

18. The system as defined in claim 1, wherein said measuring period comprises trailing 52 weeks from a date of valuation of said fund.

19. The system as defined in claim 1, wherein said method comprises embodiment in a computer program resident on an Internet server.

20. A system for causing individual investor returns in a fund to correspond to occurrence of selected events relating to investment options selected by individual investors in said fund, the system comprising a computer having a program including instructions for:

defining a plurality of said investment options, each having a yield calculator thereof having a value related to occurrence, to each said option, of predefined events, wherein said investment options comprise sports teams in a league and said predefined events comprise game wins;

selecting a nominal yield of said fund, said nominal yield comprising a fixed value based on an expected return on assets of said fund;

allocating a portion of said nominal yield to each of said investment options ratably with respect to the portion of said value of each said yield calculator bears to a total of all values of all of said yield calculators, said allocation made daily on a ratable basis to each said investor in said fund;

determining a per-share price for each of said investment options based on a relative ownership of each of said options;

calculating, on a daily basis, a change in total value of said assets owned by said fund and ratably allocating said change to investors in said fund; and periodically redetermining said values in each of said yield calculators by measuring occurrence of said predefined events during a selected measuring period.

21. The system as defined in claim 20, wherein said sports teams comprise one selected from the group of professional baseball, professional basketball, professional hockey and professional football.

22. The system as defined in claim 20, wherein post-season game wins each increment said yield calculator to a greater extent than do each regular season game win.

23. A system for causing individual investor returns in a fund to correspond to occurrence of selected events relating to investment options selected by individual investors in said fund, the system comprising a computer having a program including instructions for:

defining a plurality of said investment options, each having a yield calculator thereof having a value related to occurrence, to each said option, of predefined events, wherein said investment options comprise political parties and said predefined events comprise election to office of a member of each of said political parties;

selecting a nominal yield of said fund, said nominal yield comprising a fixed value based on an expected return on assets of said fund;

allocating a portion of said nominal yield to each of said investment options ratably with respect to the portion of said value of each said yield calculator bears to a total of all values of all of said yield calculators, said allocation made daily on a ratable basis to each said investor in said fund;

determining a per-share price for each of said investment options based on a relative ownership of each of said options;

calculating, on a daily basis, a change in total value of said assets owned by said fund and ratably allocating said change to investors in said fund; and periodically redetermining said values in each of said yield calculators by measuring occurrence of said predefined events during a selected measuring period.

24. The system as defined in claim 23, wherein an increment to said value of said yield calculator is inversely related to numbers of public offices of a particular type to which said party members are elected.

25. The system as defined in claim 24, wherein said particular types of public offices comprise United States Representatives, United States Senators, the President of the United States and Governors of each of the United States.

26. The system defined in claim 23 wherein said relative ownership is linearly related to said per share price.

27. The system as defined in claim 23 wherein said relative ownership is non-linearly related to said per share price.

28. The system as defined in claim 23 further comprising dampening changes in said per-share price for each of said investment options on initial opening of said fund to investors.

29. The system as defined in claim 28 wherein said dampening comprises setting up an initial number of shares of each of said investment options deemed to be owned by said fund, said deemed owned shares being first sold to ones of said investors electing to purchase shares of said options, wherein newly issued shares of each of said options occurs upon exhaustion of said deemed owned shares, said deemed owned shares forming part of a calculation of said relative ownership.

* * * * *